United States Patent [19]

Rzasa et al.

[11] Patent Number: 4,891,767
[45] Date of Patent: Jan. 2, 1990

[54] MACHINE VISION SYSTEM FOR POSITION SENSING

[75] Inventors: Peter W. Rzasa, W. Granville, Mass.; Matthew D. Allen; Carl H. Neuschaefer, both of Enfield, Conn.; Joseph E. Kowles, S. Glastonbury, Conn.; Thomas D. Williams, Shutesbury; Frank Glazer, Wellesly, both of Mass.

[73] Assignee: Combustion Engineering, Inc., Windsor, Conn.

[21] Appl. No.: 201,608

[22] Filed: Jun. 2, 1988

[51] Int. Cl.$^4$ ............................................. G06F 15/46
[52] U.S. Cl. ..................................... 364/513; 364/190; 901/2; 901/30
[58] Field of Search ............... 364/513, 188, 189, 190; 318/571; 901/2, 16, 9, 30

[56] References Cited

U.S. PATENT DOCUMENTS

| | | | |
|---|---|---|---|
| 4,347,652 | 9/1982 | Cooper, Jr. et al. | 29/407 |
| 4,488,242 | 12/1984 | Tabata et al. | 364/513 |
| 4,503,506 | 3/1985 | Sturges, Jr. | 364/513 |
| 4,576,546 | 3/1986 | Cooper, Jr. et al. | 364/474 |
| 4,831,549 | 5/1989 | Red et al. | 364/513 |

OTHER PUBLICATIONS

Article, Wang et al., "Robot Motion Control", *AI Expert*, Dec. 1987, pp. 26-32.

Primary Examiner—Allen MacDonald
Attorney, Agent, or Firm—Chilton, Alix & Van Kirk

[57] ABSTRACT

The video image of the end effector (26) and work surface (32) in the vicinity of the end effector is converted into a series of continually generated digitized images (132), which are further processed to detect and track the relative motion between the end effector and the work surface. After calibration (126), whereby an index of coordinates and arm orientation is established for a known positioning of the end effector relative to a known reference feature (28a) on the work surface, the tracking (168) of the motion of the end effector is utilized to continually update the index (104) to indicate the actual coordinate and orientation of the end effector relative to the work surface. The updated index is displayed on a live video monitor (44), and can be used as input to the feedback circuit (94) of the manipulator control system. In another embodiment of the invention, a high resolution monitor (52) displays an image of substantially the entire work surface, and particularly the features of interest, in the nature of a work surface map, and superimposes thereon a visual indication of the location, orientation and movement of the end effector, using the updated index information.

23 Claims, 7 Drawing Sheets

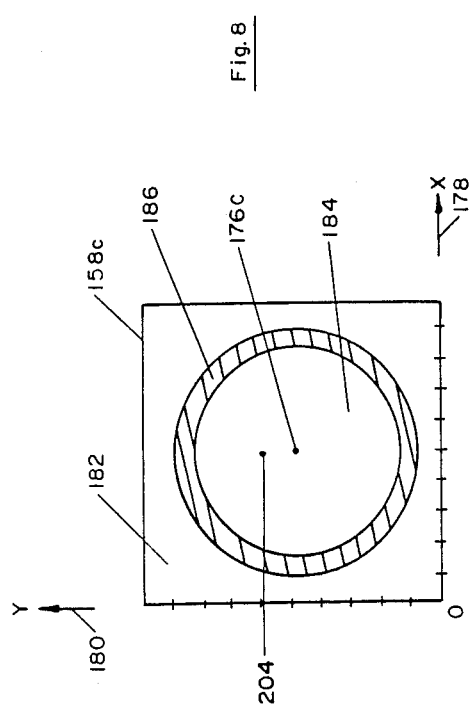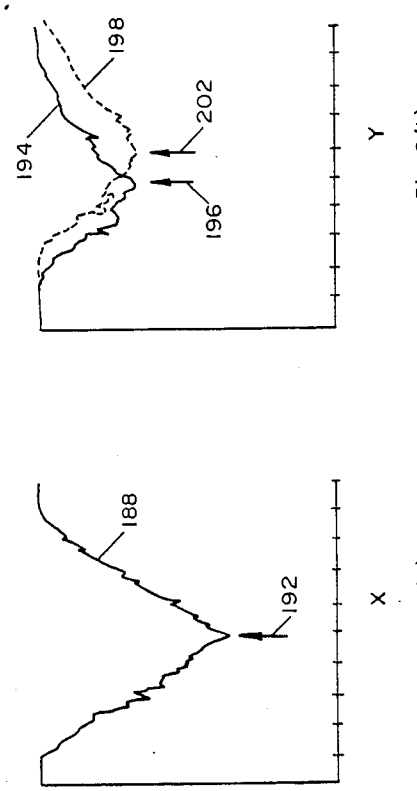

MACHINE VISION SYSTEM FOR POSITION SENSING

BACKGROUND OF THE INVENTION

The present invention relates to remote manipulators, and more particularly, to a vision system for sensing and verifying the end effector position of a robotic device for nuclear steam generator inspection and repair.

Nuclear steam generator servicing is usually performed remotely, using robotic cantilever devices commonly referred to as manipulators. A typical nuclear steam generator has thousands of tubes, affixed at their ends to a tube sheet. A preliminary step in servicing a tube with a remotely operated manipulator is to position the tooling component of the manipulator, typically referred to as the end effector, under a preselected tube end opening.

Positioning errors can have serious consequences. A steam generator tube that has been selected for inspection or repair could be bypassed because of a positioning error, and a neighboring tube inspected, sleeved, cut or plugged instead. The most serious ramification of positioning error is not the possibility that a satisfactory tube is serviced, but rather, that a tube selected for a service does not receive such planned service. If the missed tube has a defect of significant magnitude, a leak could occur during the subsequent operation of the steam generator and result in an unplanned shutdown to make the correct repair. This background highlights the need for both a reliable positioning system for remote manipulators, and for accurate independent position verification techniques.

Currently, a variety of schemes are used for positioning manipulators. The more advanced techniques rely on joint sensor feedback. Through robotic techniques known as kinematics and inverse kinematics, the joint angles required to reach a point on the tube sheet are calculated, and positioning is carried out in conjunction with inverse dynamics calculations, using joint sensor feedback. A less sophisticated method requires temporary placement of mechanical templates on the steam generator tube sheet, which identify the tube locations with alphanumeric symbols. The manipulator operator can then position the end effector by video feedback on a monitor. More recently, a tube stamping mechanism has been developed, which labels each tube permanently, allowing operators to position tools with video feedback.

All of the above mentioned techniques have some drawbacks. The manipulators which rely on sensors experience spurious movement (usually drooping) because of overweight problems associated with the resolvers. These robotic devices are also more expensive to deploy than their alternatives and are subject to potential calibration errors. The mechanical template approach results in increased radiation exposure for the personnel responsible for the template installations and deinstallations and is subject to template installation errors. The tube stamping method is currently performed only when a steam generator is relatively clean and where tube spacing is relatively large.

SUMMARY OF THE INVENTION

It is an object of the present invention to provide positioning information for the end effectors on manipulators used in steam generator servicing, or in other environments having a large work surface containing features that define work sites for the end effector.

It is a more particular object of the present invention to provide positioning information obtained independently of resolver positioning sensor mechanisms associated with the manipulator.

It is a still further object to provide positioning information which can be utilized by the manipulator control system, as a verification or additional input for actuating arm manipulator motion.

It is an additional object of the invention to provide an index indicative of the position of the end effector relative to the work surface, the index being visually superimposed on a video image of the work surface in the vicinity of the end effector.

These and other objects are accomplished in accordance with system and method embodiments of the invention, in which the video image of the end effector and work surface in the vicinity of the end effector is converted into a series of continually generated digitized images, which are further processed to identify significant features on the work surface and detect and track the relative motion between the end effector and the work surface. After calibration, whereby an index of coordinates and arm orientation is established for a known positioning of the end effector relative to a known reference feature on the work surface, the tracking of the motion of the end effector is utilized to continually update the index to indicate the actual coordinate and orientation of the end effector relative to the work surface.

In the most straightforward embodiment of the invention, the updated index is displayed on a live video monitor, to indicate the coordinate of the feature on the work surface which is closest to the end effector, as the end effector is moved along the work surface.

In a more sophisticated embodiment of the invention, the continually updated index is used as input to the feedback circuit of the manipulator control system, to either verify or influence the actuation signals that effect movement of the manipulator in one or more of its degrees of freedom.

In yet another embodiment of the invention, a high resolution monitor displays an image of substantially the entire work surface, and particularly the features of interest, in the nature of a work surface map, and superimposes thereon a visual indication of the location, orientation and movement of the end effector, using the updated index information.

BRIEF DESCRIPTION OF THE DRAWINGS

A detailed description of the preferred embodiment of the invention is set forth below, with reference to the accompanying drawings, in which:

FIG. 8 is a schematic representation of a digitized tube image contained in one of the tracking windows of FIG. 5; and FIG. 9(a) and (b) is a graphical representation of the light intensity profiles taken along mutually perpendicular axes of the windows shown in FIG. 8.

DESCRIPTION OF THE PREFERRED EMBODIMENT

Figure 1:
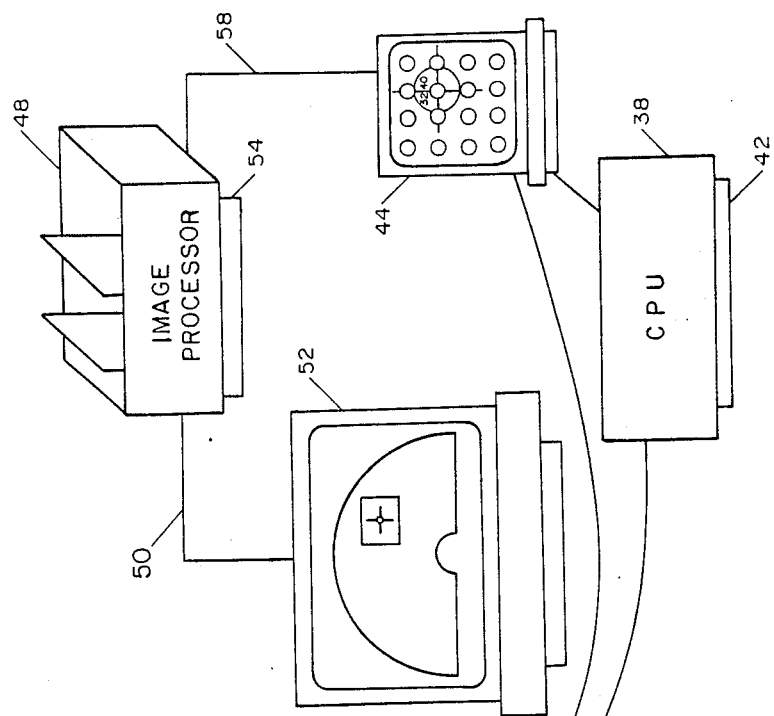
FIG. 1 is a schematic view of the tube sheet region of a nuclear steam generator and a remote manipulator system for performing tube repairs, in accordance with the present invention.
Figure 1:
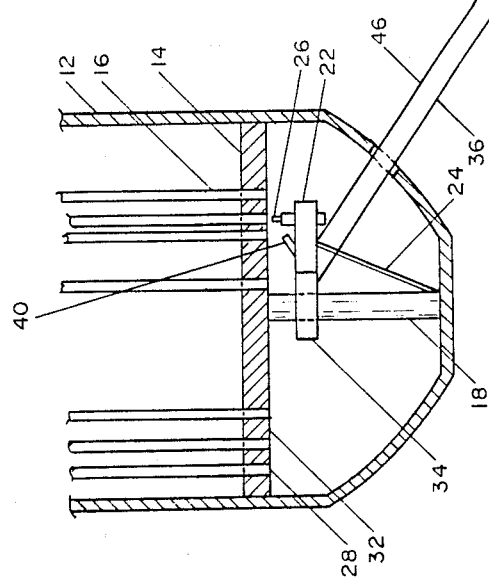

FIG. 1 shows the lower plenum region of a nuclear steam generator 12, having a transverse tube sheet 14 in which are affixed a multiplicity of tubes 16, some of which require servicing. Typically, a support structure such as stay column 18, provides a stable mounting structure for a temporary manipulator arm 22, which may further be supported by strut 24. The arm 22 carries an end effector 26 to which are attached interchangeably a variety of tools, instruments and the like, for insertion into the open ends 28 of tubes 16.

It should be appreciated that, although the preferred embodiment of the invention will be described with reference to the positioning of the end effector 26 beneath the openings 28 of selected tubes 16 which are distributed on the tube sheet lower surface 32, the invention may be utilized in other environments. In general, the invention is particularly useful where a stationary work surface 32 contains a plurality of distinct features 28 against which the end effector 26 must be precisely positioned.

In the illustrated embodiment, the drive system 34 of the manipulator arm 22 is fixed with respect to at least one degree of freedom, as by stay column 18, such that the sensors, resolvers, and actuation signals for manipulating the arm 22 can be generated with respect to a fixed frame of reference, as is well known in the art. Typically, a data line 36 connects the drive mechanism 34 to a controller unit 38, typically a high speed microprocessor adapted for numerical computations, which in turn has user interfaces in the typical form of a keyboard 42 and a video monitor or display device 44. As is known in the art, a video camera 40 may be mounted on the arm 22 and connected via line 46 to display device 44, whereby the operator can view the end effector 26 and tube sheet surface 32 in the vicinity of the end effector, and, through this visual cue, confirm that the end effector is properly positioned.

In accordance with the present invention, the video image from the signal delivered to the monitor 44 via line 46, is also delivered via line 58 to an image processing unit 48, preferably in the form of a personal computer having keyboard 54 and high resolution monitor 52. It should be appreciated, however, that two different microprocessors 38, 48 and associated keyboards 42, 54, are shown for clarity, but these could be configured within a single housing.

Figure 2:
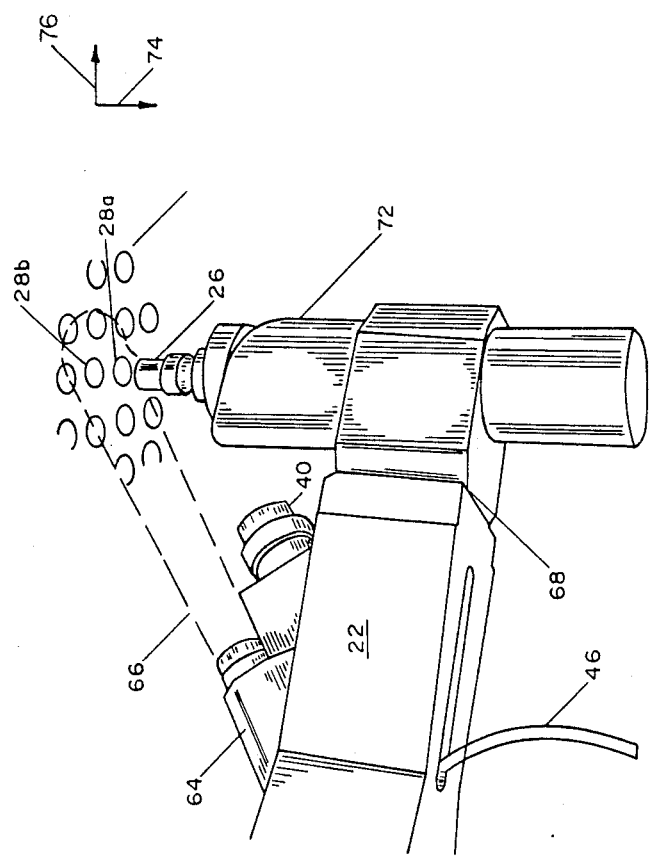
FIG. 2 is a detailed schematic view of a typical manipulator arm with end effector and video camera as utilized with the present invention.

FIG. 2 shows a typical manipulator arm 22 with end effector 26, which can be used in conjunction with the present invention. The camera 40 is angled toward the end effector 26, and an associated source of illumination, such as directed light 64, projects a beam 66 that illuminates the end effector 26 and at least some of the features, i.e., tube endings 28a, 28b, in the vicinity of the end effector 26. The arm 22 typically has several degrees of freedom as a result of its articulated structure, as indicated for example at 68. The end effector 26 is typically mounted on a tool actuator 72 which can, for example, rotate or advance the end effector 26 as required to perform the task on the tube having the opening 28a. It can be appreciated that the end effector 26 must be precisely located, i.e., coaxially, beneath the opening 28a in order to permit the servicing task to be performed. Moreover, a given tube opening 28 may require that several steps be performed with different tools and thus the repeatability of positioning the end effector 26 under a particular opening 28a is very important.

As is well known in the art of robotics, the work surface 32, in particular the features 28 of interest thereon, are positionally identified by, typically, a Cartesian coordinate system having for example, orthogonal row axis 76 and column axis 74. The movement of the end effector 26 between target end openings, such as 28a and 28b, may be preselected and specified by the operator in a Cartesian trajectory, but the control system 42, 34 for the manipulator arm 22 must be instructed to follow a trajectory in the robot's joint space. As used herein, the term "coordinate" should be understood to mean Cartesian coordinate, but where the context permits, the term can also be understood to mean coordinates in the robot's joint space.

As is evident in FIG. 2, thousands of tube openings 28 may be located on the tube sheet lower surface 32. In the illustrated embodiment, the tubes are on a uniform, rectangular array, having a uniform pitch (i.e., center-to-center spacing). This considerably simplifies the image processing required to track the end effector 26, but the invention as described herein can be generalized for implementation where the features of interest are non-uniformly spaced on the work surface. What is required, however, is a work surface geometry file or data base in which the spatial and dimensional relationships of the features on the work surface are stored.

Figure 3:
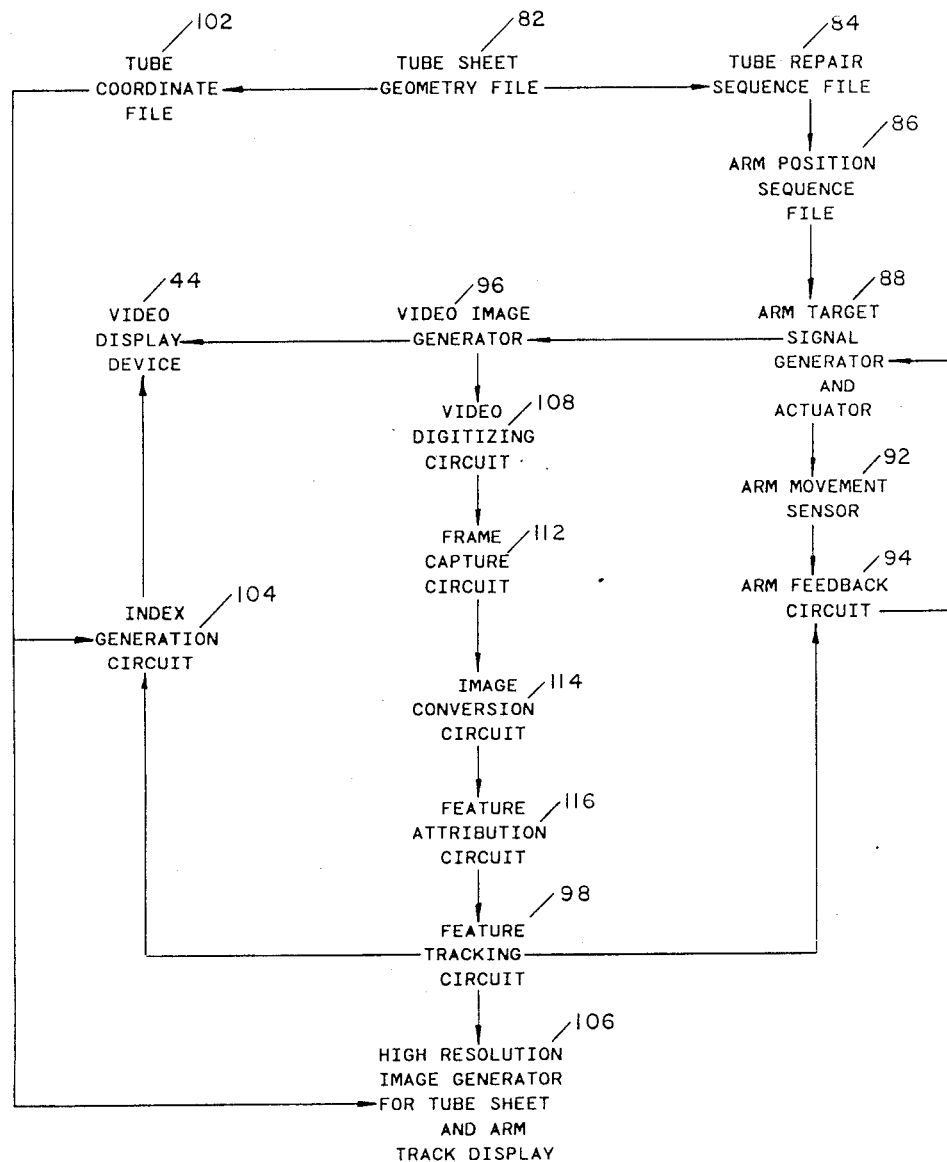
FIG. 3 is a block diagram showing the image processing portion of the present invention in relation to the associated conventional manipulator system.

FIG. 3 is a block diagram in which the relationships of the various components and signal processing circuits are set forth, beginning with the tube sheet geometry file 82. As used herein the term "circuit" includes hardwired and digital logic processing. In a typical servicing operation by a remote manipulator with end effector, the operator establishes a tube repair or servicing sequence file 84, which specifies which particular tubes from among the thousands on the tube sheet, are to be treated in some fashion by the end effector. From the data in the repair sequence file 84, the control system of the manipulator determines as at 86, the series of arm positions that is required to perform the tasks on the selected tube. The control system further generates the target signal to actuate drive unit 34 as represented at 88 and, as the arm 22 is actually moved, movement sensors as represented at 92 provide information to a feedback circuit 94 which in turn adjusts the magnitude or direction of the target signals in block 88. This control process forms no part of the present invention and is familiar to those skilled in robotics as implementing the steps of planning the trajectory, converting the Cartesian coordinates through inverse kinematics into joint space coordinates and through inverse dynamics, determining the velocity and acceleration necessary in each degree of freedom of the arm 22 to properly position the end effector 26.

Manipulator control systems typically include a video image generator which is indicated generally at 96, for displaying a live video image to the operator through display device 44. The system as described above with respect to functional blocks 82-96 and 44, relies on the manipulator arm feedback sensor, resolver, and actuation system to properly position the end effector 26. The video display device 44, is used to observe the operation of the end effector 26 and to help the operator understand any problem that may arise. The video display device as used in the prior art, is not reliable as a verification that the end effector is positioned in the tube opening as specified in, for example, the tube repair sequence file 84.

In less sophisticated manipulator systems, a template (not shown) must first be installed on the tube sheet surface and the operator can, through keyboard 42, manually position the end effector 26 using only the visual information from the video display device, see the template to obtain a unique identification to each tube opening. As described above, however, mounting of such templates is time consuming, exposes personnel to radiation in the steam generator plenum region, and is subject to error.

In accordance with the invention an "electronic template" is generated, thus avoiding the use of a mechanical template, whereby the movement of the arm or end effector results in the tracking of the tubes over which the end effector is moving, as indicated at block 98. In conjunction with a tube coordinate file 102 extracted from the tube sheet geometry file 82, the feature tracking 98 is manifested to the operator through an index generation circuit 104, whereby an informative index (or the Cartesian coordinates along the axes 74, 76), is displayed to the operator superimposed on the live video image in display device 44. The index can include information on the orientation of the arm, either as an alphanumeric or symbolically. In this manner, as the operator manually moves the manipulator arm 22, or as the arm moves automatically in accordance with the control scheme represented by blocks 84-94, the operator obtains a positive verification of the identification of the tube opening nearest the end effector.

In accordance with the preferred embodiment of the invention, the video images generated at 96 in the form of discrete reflected light intensities input to display device 44, are digitized at 108 in a "snapshot" array of numeric values, which are stored in a frame buffer 112 having a predefined, constant buffer size, e.g., a 512 by 512 array. Although the visual image of the work surface near the end effector 26 is perceptible to the user through video display device 44, such complete visual picture is not necessary for defining the features of the tubes in a manner that is usable to track the relative motion between the end effector and the tubes. Thus, as indicated at block 114, it is preferable to reduce the amount of information requiring subsequent processing, by converting the digitized image in block 112, into simpler form which contains only salient attributes of the features of interest.

For example, a binary image consisting of an array of only black and white bits, e.g., zeros and ones, can be generated from the video image. Numerical computations on the binary values in the frame buffer can produce a new image, with noise reduced and certain details enhanced. For example, the sizes, shapes and centroids of the objects on the tube sheet can be determined. This is indicated in block 116 as feature extraction or attribution and is, of course dependent on which objects or attributes on the work surface define the work locations for the end effector.

Although the conversion to binary images may be preferred under some circumstances, it has been found that, due to variations in illumination, shadows, surface coloration, and the like, reliance on absolute thresholds of illumination to categorize a pixel into either a white or black binary bit, results in considerable uncertainty or relatively slow processing speed. In the preferred embodiment of the invention, as more fully described below, the image conversion circuit 114 and associated algorithm utilizes two, and preferably three "windows", each containing a digital representation of a particular tube. The geometric relationship of the windows and the way in which they move relative to an imaginary boundary, provides input to the tracking circuit 98. Image conversion can be accomplished with a microcomputer board such as the MVP-AT machine vision processor available from Matrox Electronics Systems Ltd., Quebec, Canada.

The function of the feature tracking circuit 98 is, in effect, performed in software, to interpret the time dependent changes in the features contained in the snapshot frames as established in block 116. In this step, motion is detected, motion direction is determined, object recognition and object tracking are performed, and the end effector position is calculated. The motion detection, motion direction, and object recognition tasks are accomplished by correlating differences found over time among the features identified during low level image processing in block 116. The results of the operations are factored in with calibration data initially obtained as described below, and the steam generator specific geometry as obtained through tube coordinate file 102. Thus, using the index generation circuit 104, the vide display 44 is continually updated to provide the user with a visual or other index on the latest position calculation of the end effector.

In a complete implementation of the present invention, a high resolution image generator 106 obtains data from the tube coordinate file 102 or similar modified version of the tube sheet geometry file 82, to generate a figurative "map" of the entire tube sheet work surface 32 on display device 52. The output of the feature tracking circuit 98 is used to position and move a cursor or the like on the monitor 52, i.e., on the map image of the steam generator work surface, whereby the position of the end effector 26 can be "seen" relative to all, or a very large number, of the tubes in the tube sheet.

In a further refinement of the invention, as used with a "smart" manipulator that has the type of control system represented by blocks 84-94 in FIG. 3, the output of the feature tracking circuit 98 is delivered to the arm feedback circuit 94 and utilized as an electronic verification that the arm movement detected by sensors in block 94, has relocated the end effector to the correct tube opening as selected in the tube repair sequence file 84. Moreover, the control algorithm of a conventional manipulator of this type could be modified to include as an input signal to the feedback circuit 94, the output of the feature tracking circuit 98, thereby directly influencing the trajectory of the manipulator arm.

Figure 4A:
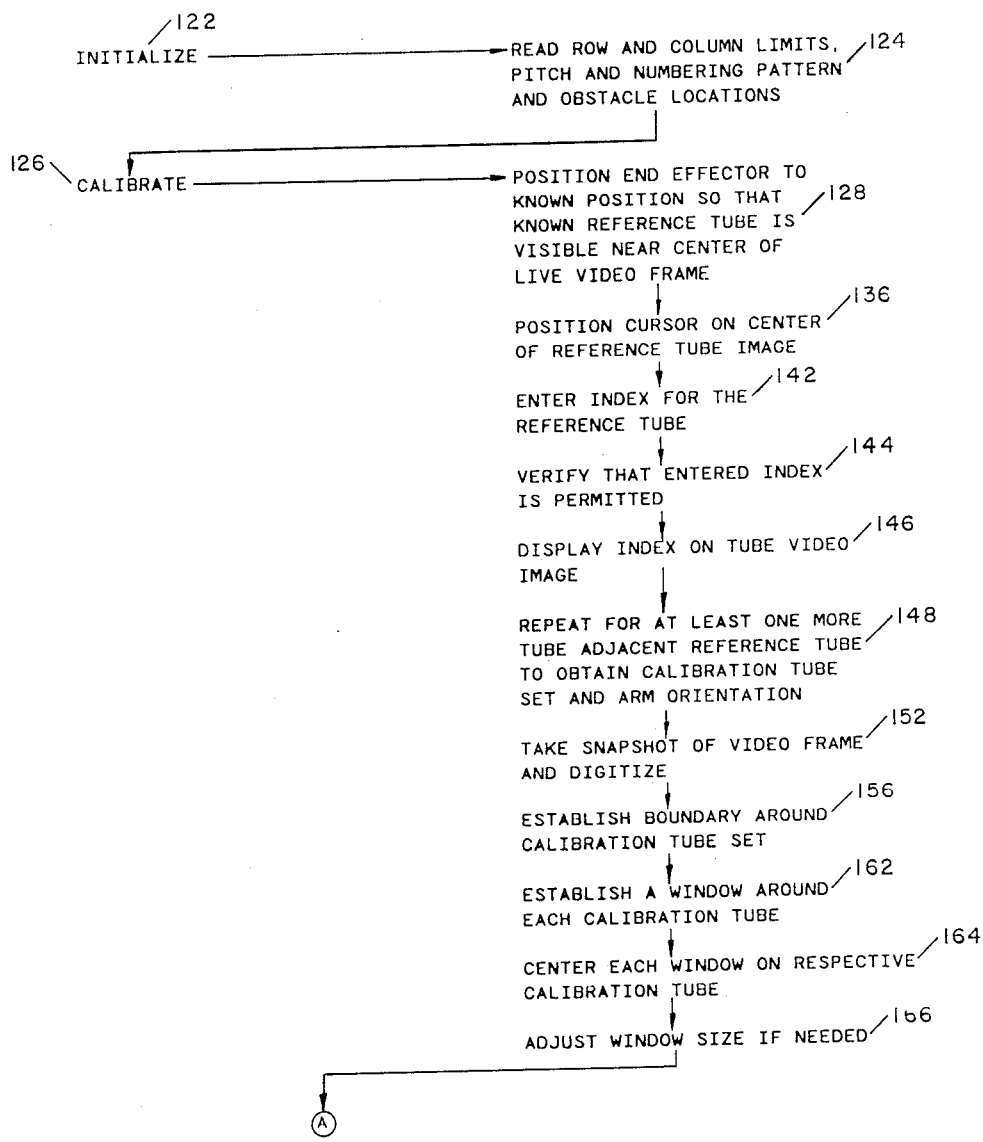
FIGS. 4a and 4b constitute flow chart of the process steps associated with implementing the preferred embodiment of the invention.

FIG. 4 is a high-level flow chart of the steps associated with implementing the invention as represented in FIG. 3. Once the manipulator has been mounted on the stay column 18 as shown in FIG. 1, the arm 22 is positioned to a known reference location on the tube sheet surface and the image processing system is initialized at 122. Reference herein to image processing system should be understood to refer to the camera 40, data lines 46, 58, and 50, video display device 44, processor 48, high-resolution monitor 52, keyboard 54, and the files and modules associated with functional blocks 82, 96, 98, 104–116 of FIG. 3. In this context, initializing means reading the row and column limits, the pitch and numbering pattern, and the obstacle locations from the tube sheet geometry file 82 (FIG. 3), and assuring that the electronic template software has been internally checked and is displaying a cursor on the live video image.

Figure 5:
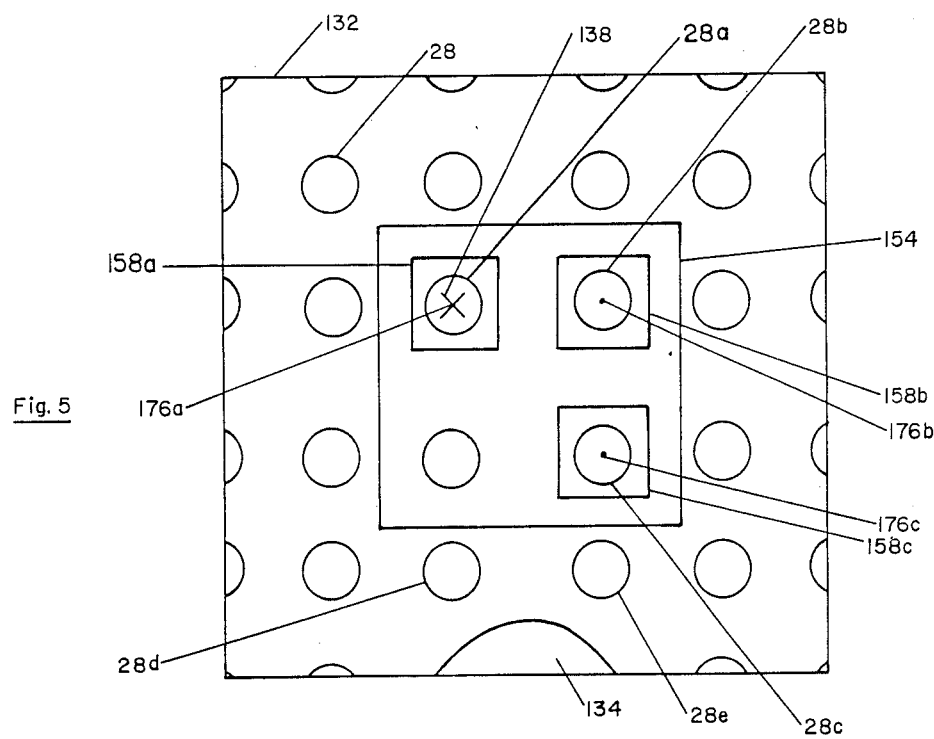
FIG. 5 is a schematic representation of a video image frame with a figurative inner boundary and tracking windows shown thereon as utilized in the preferred embodiment of the invention.

Calibration as indicated at 126, is performed by the operator's driving the arm to a know position of the end effector in relation to a known reference tube 28a that is visible near the center of the live video frame 132, as shown in FIG. 5. In a typical video frame containing 512×512 pixels, a plurality of tubes are visible, along with a portion 134 of the arm 22. In step 136, the operator positions the cursor 138, using the key board arrow keys, approximately in the center of the tube 28a. Since the operator initially positioned the end effector in step 128 to a reference position, the operator can then enter at step 142, the index for this particular reference tube 28a. Preferably, in step 144, a verification is made that, for example, the coordinate entered by the operator in step 142, is a permitted coordinate consistent with the tube sheet geometry file 82 or tube coordinate file 102. After this check, the coordinate can be displayed superimposed on the image of tube 28a, as indicated at step 146.

In the preferred embodiment, steps 128–146 are repeated for at least one more tube and, preferably, for two more reference tubes 28b, 28c, as indicated at step 148, these tubes being adjacent to each other and having their centers forming a triangle. These additional tubes provide information which uniquely specifies the orientation of the arm relative to the tube sheet.

The next step 152 is to take a snapshot of the video frame 132 and to digitize it in a conventional manner. A tracking boundary 154 is figuratively established in software, around the three tubes 28a, 28b, and 28c, which, at this stage, can be referred to as the calibration tube set, as indicated at 156. In a typical implementation, the tracking boundary 154 is a square enclosing approximately 150×150 pixels.

Although theoretically the tracking boundary could be the same as the border of the frame 132, and all tubes 28 within the frame could have their salient attributes extracted, computational economy is gained by tracking a subset of tubes relative to a boundary that is smaller than the frame. The boundary 154 is utilized as if it were fixed in relation to the end effector or arm image 134. Each of the three calibration tubes is then figuratively surrounded by a square "window" 158a, 158b, and 158c, as indicated in step 162. Each calibration tube is then centered within its respective window 158, as indicated in step 164, and the window size is adjusted if needed to assure that the windows do not overlap, that they are equidistant from each other, and that each is fully within the boundary 154, as indicated at step 166. In this calibration procedure, it should be appreciated that the actual nominal tube size is known a priori, but the apparent size of the tube, as viewed through the video image generator 96 and display device 94 relative to the size of the frame 132, will depend on the focal length of the camera, i.e., on the distance from the camera 40 to the tube sheet surface 32. The tube size determination for purposes of image processing, is determined from the relative locations of the three selected adjacent calibration tubes 28a, 28b, and 28c.

It should be appreciated that the usual or preferred manner of displaying a position index would be displaying Cartesian coordinates corresponding to the axes 74, 76, but other indices instead of, or derived from these Cartesian coordinates may be useful in some circumstances. Accordingly, it should be understood that the term "index" is meant as a generic indicator of end effector position, whereas "coordinate" is a particular type of index. Upon completion of the calibration step 126, the calibration index is displayed on the video display device 44 to indicate the reference tube opening or marker closest to the end effector. Optionally the indices for each of the three calibration tubes may be displayed as well. It should be appreciated that the tube closest to the end effector need not be one of the tubes within a window 158, if proper offsets are made.

Figure 4B:
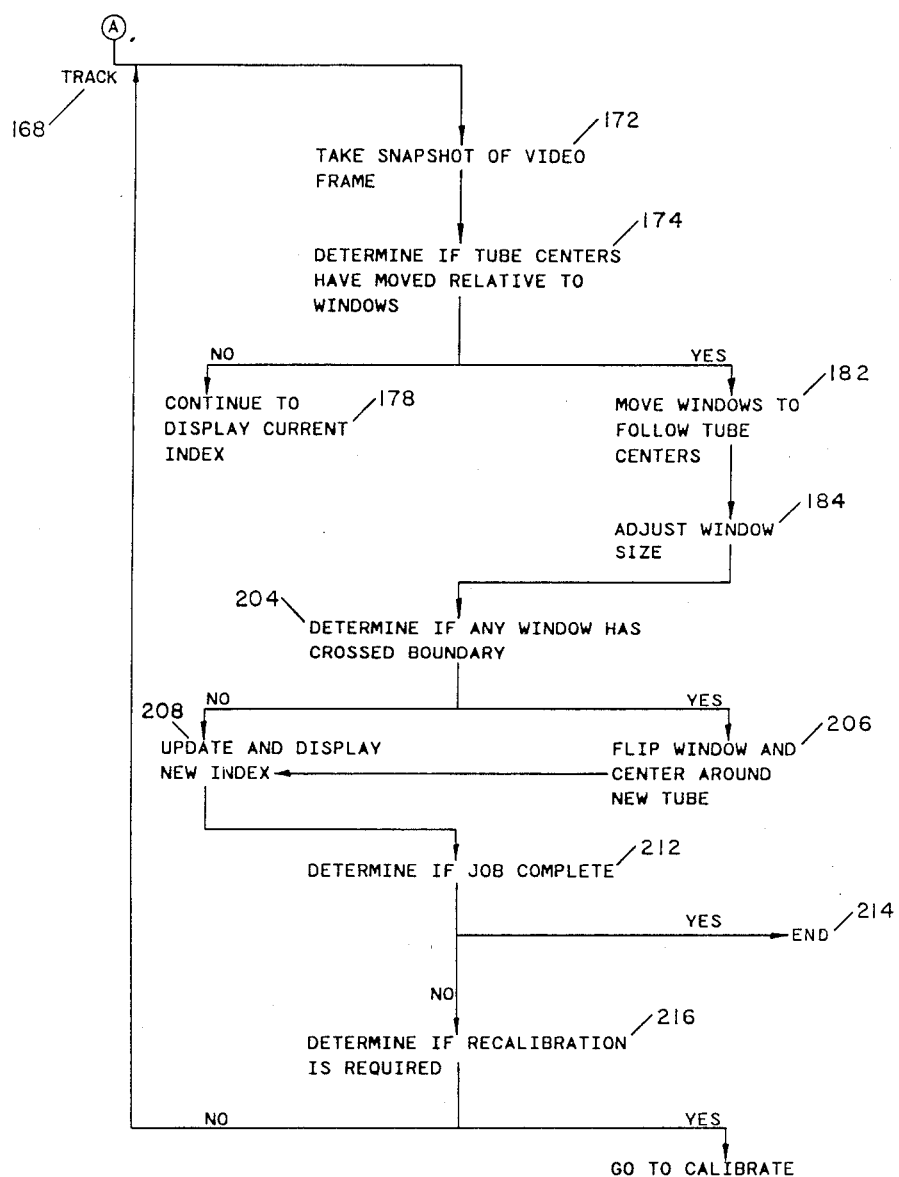

The final module of the signal processing system tracks the movement as indicated at 168 in FIG. 4b. Tracking is accomplished by continually taking snapshots, as at 172, and inferring movement from the changes in snapshot digital images resulting from changes in the video images accompanying displacement of the arm by the arm control system. It should be understood that the term "continually" as used herein, means as frequently as is reasonable given the need to balance accuracy with execution speed. Ideally, a continuously changing image could be used to track arm movement. As in the projection of discrete images on a home T.V. monitor at a rate faster than can be perceived individually by the human eye, a series of continually generated images can serve the same purpose as continuously generated images. The sampling rate of taking the snapshots, or time between frame grabs, must be fast enough to detect true movement of the arm, or else the algorithm could get lost due to aliasing. The sampling rate is dependent on both the video image scan rate and the processing time required to calculate positions.

By using the figurative boundary 154, the signal processing in circuit 98 tracks whether the individual tubes 28a, 28b, and 28c appear to move relative to the image 134 of the arm. In the preferred embodiment, in step 174 it is determined if the tube centers 176a, 176b and 176c have moved relative to the respective windows 158a, 158b, and 158c. If no movement has occurred, then the current display indices continue to be shown, as indicated at 178. If movement is detected, the windows are adjusted to follow the respective tube centers, as indicated at 182. During movement tracking, the window sizes are adjusted as at 184 by using the relative positions of the three windows to determine scale, and this procedure is considerably simplified by the fact that, for a tube sheet of a steam generator, the tubes are all of the same diameter and are on a uniform pitch.

FIGS. 8, 9 and 10 illustrate the preferred technique for locating and tracking the movement of the tube centers. FIG. 8 is an enlarged view of window 158c superimposed on an X axis 178 and a mutually perpendicular Y axis 180. The digitized light intensities within window 158c are reflected from three principal areas, the highly reflective base surface 182, the essentially non-reflective hollow tube interior 184, and the moderately reflective tube wall 186. The digitization of the video image assigns numeric values to each of the pixels within window 158c and these values can be added together to obtain a tube profile. In FIG. 9a, the "Y sum" axis represents the accumulated value of adding together the numeric value for each of the pixels taken in the Y direction at a given point on the X axis. The plotted curve 188 shown in FIG. 9(a) is interpreted to mean that at the X origin and at the maximum X position in the window, the accumulated intensity values are at their highest, because the values accumulate only over the base surface 182. The lowest accumulated intensity values are found at the X position corresponding to the center of the tube 176c as indicate by arrow 192 in FIG. 9(a), because this is where the greatest contribution of the very absorptive tube interior 184 occurs. A similar profile 194 is shown in FIG. 9(b) with the corresponding minimum accumulated value at Y position indicated by 196. It should be appreciated that the curves 188 and 194 represent a tube that is perfectly centered within the window 158c. It should also be appreciated that, if the tube were not centered in the window, the center could nevertheless be located by determining the X and Y coordinates of the profile low points. For example, curve 198 represents a condition wherein the tube center is at the X position 192 indicated in FIG. 9(a), but at a Y position 202 corresponding to point 204 of FIG. 8.

This profile monitoring technique inherently compensates for variations in light intensity on the tube sheet because the relative intensities are used at each snapshot, rather than absolute light intensities relative to a threshold value used repeatedly for a series of snap shots. Apparent tube distortion due to camera angle and the like, is automatically compensated. The intersection of the profile low points such as 192, 196, define the tube centers within the windows, and provide a basis for any movement of the tubes to be followed by movement of the corresponding windows. The windows move so as to keep the salient attribute of the feature, e.g., the inferred tube center, within the window. This insures that apparent motion will be detected.

Figure 6:
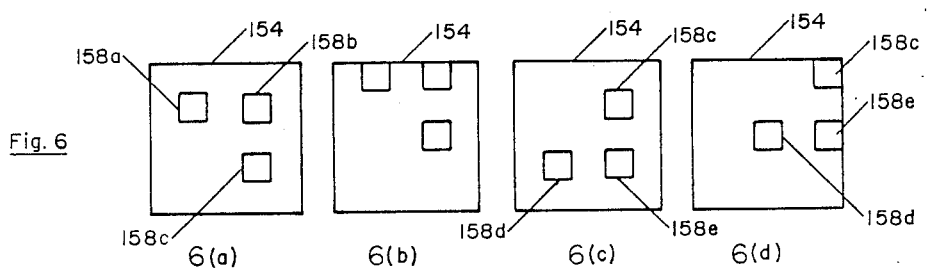
FIG. 6(a)-(d) is a schematic representation of the apparent movement and exchange of the tracking windows within the boundary shown in FIG. 5.
Figure 7:
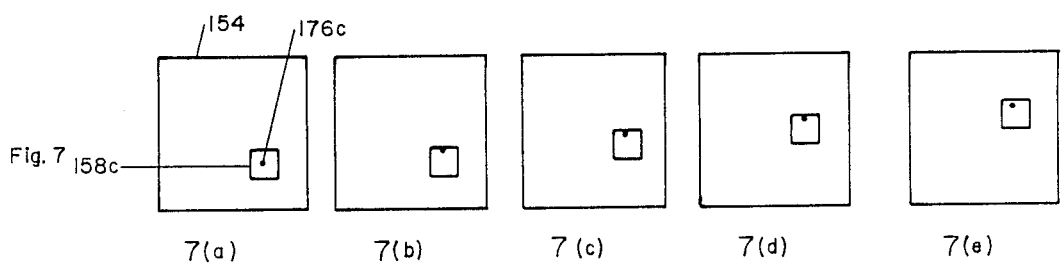
FIG. 7(a)-(e) is a schematic representation of one window figuratively following its contained tube image within the boundary shown in FIG. 5.

This is shown in FIGS. 6 and 7 where the set of windows 158a, 158b, and 158c appears to move upwardly relative to boundary 154 so that, in order to continue tracking such movement, windows 158a, and 158b are "released" and new windows 158d and 158e are "grabbed" in a figurative "flip". This is illustrated in the sequence of FIGS. 6(a)–6(c). Between FIGS. 6(c) and 6(d), the windows apparently move upward and to the right and, if such movement continued, windows 158c and 158e would eventually be "flipped" in similar fashion to the change between FIGS. 6(b) and (c). The need for such flipping is determined at step 204 in FIG. 4. If necessary, the flipping is performed in step 206, but it should be appreciated that it may be desirable to flip no more than one window, the farthest from the boundary center, on each snapshot. Furthermore, in the tube sheet boundaries and other areas of irregularity in the work surface, an additional criteria for permitted kinds of flips may be needed. Whether or not a flip is required, as the movement of the windows is tracked, the index is updated and displayed accordingly, as at step 208.

FIG. 7 illustrates one way of keeping the windows such as 158c moving with the movement of the tube center 176c. The sequence shown in FIG. 7(a)–(e) corresponds to the apparent upward movement of window 158c between positions shown in FIG. 6(a) and (c), with the window lagging slightly. In this technique, with each snapshot, the window is moved to the position of the tube center from the previous snapshot. During substantially continuous movement of the arm, the apparent movement of a given tube center will be one snapshot ahead of the window. Thus, movement between snapshots must be less than one half the minimum distance between tube centers to prevent aliasing, and preferably one third less.

Although tracking can be accomplished by windowing and following only two tubes, the use of three tubes provides a robust and generalized way of accounting for rotational motion and scaling. Furthermore, although the intensity profile technique for locating or extracting the tube centers has been found to perform satisfactorily, gradient based, correlation, or other motion detection techniques may be advantageously used in conjunction with or as a substitute for steps in the feature extraction and motion detection technique described herein.

After updating and displaying the new index, a determination is made if the job is complete, as at 212. If so, the processing ends at 214 or, if not, a determination is made at 216 as to whether a recalibration is required. In conventional robotic servicing, it is not uncommon for recalibration to be performed every time five tubes have been located by the end effector. With the present electronic template integrated as an independent verifier of position, location verification could be performed only when the manipulator and vision verification differ. It is expected that, under these conditions, recalibration would not be required until at least ten tubes have been located and serviced by the end effector, resulting in a substantial gain in productivity. If recalibration is not required, the algorithm loops back to track 168 and repeats until either recalibration is required at 126, or the job is completed at 214.

We claim:

1. A system for sensing the position of an end effector on a remotely manipulated robot arm, comprising:
   a manipulator arm having at least two degrees of freedom for displacing an end effector;
   an arm control system responsive to input signals generated remotely from the arm, for positioning the arm relative to a stationary work surface;
   means for illuminating the work surface in the vicinity of the end effector;
   means for generating a video image of the end effector and the illuminated surface;
   means for establishing a reference coordinate of the end effector for a known reference position of the arm relative to the work surface;
   means for generating a digitized image of at least a portion of the generated video image when the video image includes the reference position;
   means for calibrating the digitized image to the video image by associating the reference coordinate of the end effector in the video image with a reference coordinate of the end effector in the digitized image;
   means for continually processing changes in the digitized images resulting from changes in the video images accompanying displacement of the arm from the reference position by the arm control system, to continually track the path of movement of the arm; and means responsive to the means for processing changes, for continually generating an index indicative of the actual coordinate of the end effector relative to the work surface as the arm is displaced along the work surface.

2. The system of claim 1, further including means coupled to the means for processing, for storing a data file representing preselected geometric features of the work surface.

3. The system of claim 2, wherein the work surface is a steam generator tube sheet and the preselected features include the tubes in the tube sheet.

4. The system of claim 3, wherein the preselected features further include a reference feature which is discernible in said generated video image when the arm is in said reference position.

5. The system of claim 3, wherein,
the means for generating a video image is coupled to the means for storing a data file of the work surface and to the means for generating a digitized image,
the means for continually generating an index includes means for generating an index associated with each of a plurality of tubes that are visible in the video image, and
the system further includes means for displaying the respective indices of the images of each of said plurality of tubes that are visible in the video image.

6. The system of claim 2, further including a high resolution monitor coupled to the means for storing the data file and the means for continually processing changes in digitized images, for generating a video map of the entire work surface and indicating on the map the current position of the end effector relative to the work surface.

7. The system of claim 1, further including means coupled to the means for generating an index, for displaying the index in the video image.

8. The system of claim 1, wherein
the work surface has a plurality of significant discrete features, and
the means for continually processing includes means for converting the digitized image of each of at least two features into at least one salient attribute and means for comparing changes in the salient attributes resulting from changes in the video images accompanying displacement of the arm, to track the path of movement of the arm.

9. The system of claim 8, wherein,
the work surface is a steam generator tube sheet,
the significant discrete feature is an individual tube end, and
the salient attribute of the tube end includes the centroid of the tube end.

10. The system of claim 1, wherein the arm control system includes,
sensor means coupled to the means for continually generating an index, for generating a first signal commensurate with the actual displacement of the arm in each direction of freedom,
target means for generating a second signal, indicative of the desired displacement of the arm in each direction of freedom, and
feedback means responsive to the first and second signals, for adjusting the second signal commensurate with the difference between the first and second signals.

11. A method of sensing the position of an end effector on a remotely manipulated robot arm relative to distinct features on a work surface having a known geometry, comprising the steps of:
mounting the arm so that the end effector is adjacent the work surface;
generating a video image of the end effector and the work surface in the vicinity of the end effector;
positioning the end effector at a known reference position relative to a reference feature on the work surface;
establishing a reference coordinate for the reference position of the end effector;
generating a digitized image of at least a portion of the video image;
calibrating the digitized image to the video image such that the reference coordinate of the end effector in the video image and the reference coordinate of the end effector in the digitized image are the same;
moving the arm relative to the work surface;
continually processing changes in the digitized image as the arm is moved, to continually track the coordinates of the path of movement of the end effector; and
displaying an index indicative of the actual coordinate of the end effector as the end effector is displaced from the reference position.

12. The method of claim 11 wherein the features have the same, known size and the step of calibrating includes the step of establishing a quantitative relationship between the size of the discrete features on the work surface as appear in the digitized image and the known size of the features.

13. The method of claim 12 wherein the step of processing the the changes includes,
continually capturing frames of digitized images of at least a portion of the video image that is generated as the arm is displaced,
scaling the digitized images in accordance with the quantitative relation established in the step of calibrating, and
comparing the changes in digitized images of at least two of the features contained in the frame resulting from changes in the video images accompanying displacement of the arm, with the known geometry and features of the work surface, to continually track the path of movement of the end effector.

14. The method of claim 13 wherein the step of comparing includes the steps of,
converting the digitized image of each of at least two features into a salient attribute that is characteristic of the feature, and
inferring from apparent movement of the salient attributes, the path of movement of the end effector.

15. The method of claim 14 wherein the features are tube ends and the salient attribute is the centroid of the tube end.

16. The method of claim 15 wherein,
the step of converting includes representing the centroid by a figurative window having a digitized image size at least equal to the digitized image size of a tube end and controlled to figuratively contain the centroid, and
the step of inferring includes,
figuratively establishing a boundary within the digitized frame image, and relating changes in the relationship between each window and the boundary, to the known geometry of the work surface.

17. The method of claim 16 wherein the step of inferring further includes the step of eliminating a first window and substituting a second window in the step of relating, when the first window figuratively crosses the boundary.

18. The method of claim 15 further including the step of determining the centroids of the tube ends in the digitized image by computing and comparing the intensity profile of the tube image along two different axes.

19. The method of claim 11, further including the steps of,
selecting as a work surface, a tube sheet having as said features, tube ends of the same nominal diameter, and
storing a file containing data indicative of the geometry and dimensions of the work surface and the tube ends, and wherein,
the step of calibrating includes,
generating a digitized image of a reference tube, and
establishing a quantitative relation between the size of the digitized reference tube and the nominal diameter of the tube, and
the step of processing includes the steps of
continually capturing digitized frames of the video image and converting the digitized image of at least two tubes into salient attributes, and
from the quantitative relation, the data indicative of the geometry and dimensions of the work surface and tube ends, and the changes in the salient attributes accompanying displacement of the arm, tracking the path of movement of the end effector.

20. In a remote manipulator system including an articulated manipulator arm, an end effector on the manipulator arm, a manipulator control system for moving the arm to position the end effector sequentially in a desired relationship relative to discrete features on a work surface, and means mounted for movement with the arm for generating a video image of the work surface including a plurality of features as the arm is moved, the improvement comprising:
image sampling means for continually capturing a predetermined portion of the video image containing a plurality of features to produce a series of digitized image frames;
image conversion means coupled to the image sampling means, for extracting from each digitized image frame, a salient attribute of ach of at least two said features; and
tracking means coupled to the image conversion means, for inferring from changes in the salient attributes in the series of digitized frames, the path of movement of the arm relative to the work surface.

21. The system of claim 20 wherein,
the image conversion means extracts the salient attributes associated with the centroids of three adjacent features, and
the tracking means infers the changes in the positions of the three centroids relative to the centroids in the previously captured digitized image frames.

22. The system of claim 21, wherein the tracking means further includes,
means for generating a figurative boundary within the digitized image frames,
and wherein the changes in the positions of the three centroids are inferred relative to the boundary.

23. The system of claim 20, further including means coupled to the means for generating a video image and coupled to the tracking means, for displaying on the video image, an index indicative of the current position of the end effector relative to the work surface.

* * * * *